United States Patent [19]
Tseng et al.

[11] Patent Number: 5,812,636
[45] Date of Patent: Sep. 22, 1998

[54] SYSTEM AND METHOD FOR FAULTY MOBILE UNIT ISOLATION

[75] Inventors: Stone Tseng; Kalyan Basu, both of Plano, Tex.

[73] Assignee: Northern Telecom Limited, Quebec, Canada

[21] Appl. No.: 711,633

[22] Filed: Sep. 6, 1996

[51] Int. Cl.$^6$ ............................ H04M 1/24; H04M 11/00; H04Q 7/00

[52] U.S. Cl. ................................. 379/32; 379/2; 379/34; 455/423; 455/425

[58] Field of Search .................................. 379/2, 10, 15, 379/22, 24, 26, 27, 29, 30, 32, 34, 113, 133, 134; 455/423, 424, 425, 67.1, 67.3, 226.1, 226.2, 226.3; 370/242, 250, 251; 375/224, 227

[56] References Cited

U.S. PATENT DOCUMENTS

| | | | |
|---|---|---|---|
| 4,625,308 | 11/1986 | Kim et al. | 370/104 |
| 4,890,227 | 12/1989 | Watanabe et al. | 364/300 |
| 5,023,900 | 6/1991 | Tayloe et al. | 455/424 |
| 5,159,685 | 10/1992 | Kung | 395/575 |
| 5,272,704 | 12/1993 | Tong et al. | 371/23 |
| 5,317,725 | 5/1994 | Smith et al. | 395/575 |
| 5,432,842 | 7/1995 | Kinoshita et al. | 379/60 |
| 5,448,760 | 9/1995 | Frederick | 455/425 |
| 5,542,120 | 7/1996 | Smith et al. | 455/54.1 |
| 5,687,217 | 11/1997 | Bliss et al. | 379/34 |
| 5,706,333 | 1/1998 | Grenning et al. | 455/423 |

FOREIGN PATENT DOCUMENTS

| | | |
|---|---|---|
| 0 708 573 A2 | 4/1996 | European Pat. Off. . |
| WO 92/21182 | 11/1992 | WIPO . |
| WO 93/15591 | 8/1993 | WIPO . |
| WO 94/03986 | 2/1994 | WIPO . |
| WO 94/03992 | 2/1994 | WIPO . |

OTHER PUBLICATIONS

C. Klahr, "An Expert System Can Greatly Reduce Expenditures for Telecommunications," Data Communications, Jul. 1985, pp. 155, 156, 159, 160, 163, 164, 167.

K. Compton, "Applications of AI technology in Communications Networks," Expert Systems, Aug. 1988, vol. 5, No. 3, pp. 248–251.

A. Kandel et al., "On the Applicability of Knowledge–Based Systems in Communication," Fourth Israel Conference on Computer Systems and Software Engineering, Jun. 1989, pp. 146–152.

A. Hiramatsu, "ATM Communications Network Control by Neutral Networks," IEEE Transactions on Neural Networks, vol. 1, No. 1, Mar. 1990, pp. 122–130.

Kall, J. et al, "Maintenance Information in the GSM System," International Conference on Digital Land Mobile Radio Communications, pp. 497–506, Jun. 30, 1987.

*Primary Examiner*—Paul Loomis
*Attorney, Agent, or Firm*—Finnegan, Henderson, Farabow, Garrett & Dunner, L.L.P.

[57] ABSTRACT

A wireless network, having a plurality of mobile units operating in a cell of the wireless network, isolates a faulty mobile unit that jams the control channel thereby preventing communication by the other mobile units in the cell. A system and method for isolating the faulty mobile unit monitors the cell traffic pattern among the mobile units in the cell to detect an abnormality, determines whether the abnormality is due to the faulty mobile unit or a problem with the wireless network, and if the abnormality is due to the faulty mobile unit, communicates with the mobile units operating within the cell to isolate the faulty mobile unit.

49 Claims, 5 Drawing Sheets

SYSTEM AND METHOD FOR FAULTY MOBILE UNIT ISOLATION

BACKGROUND OF THE INVENTION

The present invention relates to a system and method for isolating a faulty mobile unit that has interfered with normal network communication in a wireless network.

Conventional wireless communication networks contain many cell sites and a centrally located cellular switch, called a Mobile Switching Center (MSC). Each cell site typically includes one or more antennas and associated equipment for communicating with mobile units such as cellular telephones.

Each cell site uses only a single Control Channel (CCH) which includes a "forward" CCH and a "reverse" CCH. Each cell site continuously broadcasts signals to the mobile units over the forward CCH. In contrast, the mobile units periodically broadcast signals to the cell site over the reverse CCH.

When a mobile unit first turns on, it scans all forward CCHs for the one with the strongest signal and listens to that forward CCH for periodically broadcast messages from the cell site. These messages typically contain information regarding access parameters for the wireless communication network and information about the current availability of the reverse CCH for that cell site. When the reverse CCH becomes free, the mobile unit seizes the reverse CCH and attempts to register itself.

When the mobile unit turns on but is not in active use, it periodically scans the forward CCHs assigned to the system and marks the strongest carrier for use. The mobile unit's receiver remains tuned to this strongest carrier and continuously decodes a digital modulating data stream from the cell site on the forward CCH to look for incoming calls.

Any call to a mobile unit is initiated like a normal telephone call. A user dials a seven- or ten-digit number and the wireless telephone network routes the call to a central computer. The central computer broadcasts the number on the forward CCHs to every cell site in the network. When a called mobile unit detects its number in the incoming data stream, it sends its identification back to the central computer. The central computer uses a digital message on the forward CCH to designate a channel for the mobile unit to use. The mobile unit tunes to the designated CCH and alerts the user to the incoming call.

When the mobile unit user originates a call, the user first dials the desired telephone number into a register in the mobile unit. The mobile unit transmits this number over the reverse CCH to the cell site with the strongest carrier. The central computer then designates a channel for the call and the mobile unit automatically tunes to that channel.

All wireless communication providers attempt to provide robust communication services, but the single CCH provided by each cell site may pose a barrier to accomplishing this objective. Sometimes a faulty mobile unit gets stuck on the CCH and continuously transmits power on the carrier frequency of the reverse CCH. This jams the CCH and other mobile unit users within this CCH coverage area encounter major service disruption because they cannot obtain access to the reverse CCH.

Therefore, there is a need in wireless communication networks for isolating faulty mobile units within the network service area to alleviate the service disruption.

SUMMARY OF THE INVENTION

The present invention solves this need by isolating a faulty mobile unit to alleviate service disruption.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve these objects, and in accordance with the purpose of the invention as embodied and broadly described herein, the present invention includes a system for isolating a faulty mobile unit of a plurality of mobile units operating in a cell of a wireless network. The system monitors the cell traffic pattern among the mobile units in the cell to detect an abnormality and determines whether the abnormality is due to the faulty mobile unit or a problem with the wireless network. If the abnormality is due to the faulty mobile unit, the system communicates with the mobile units operating within the cell to isolate the faulty mobile unit.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DESCRIPTION OF THE PREFERRED EMBODIMENTS

Figure 1:
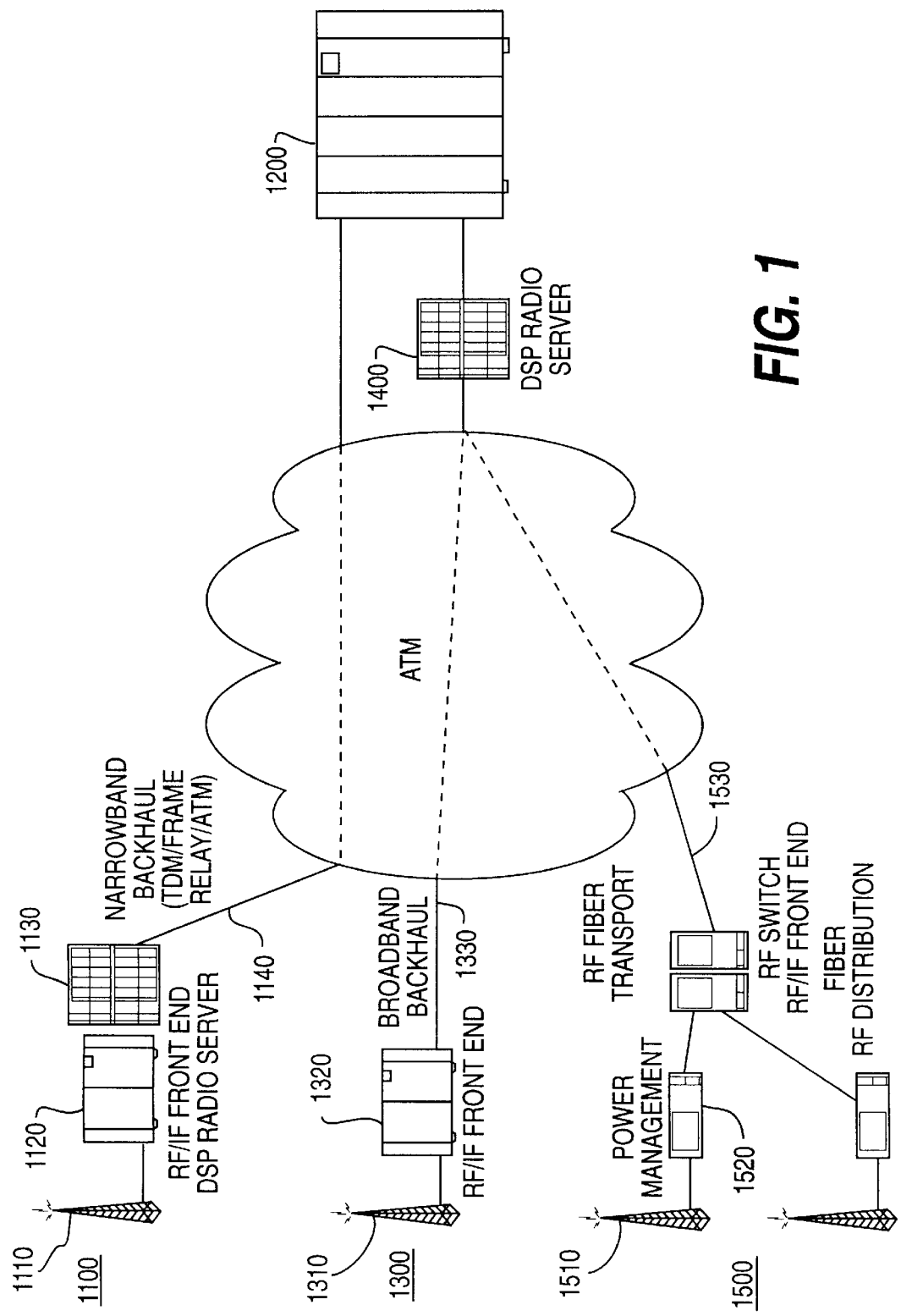
FIG. 1 shows a wireless network executing the faulty mobile unit isolation method of the present invention.

FIG. 1 shows a wireless network executing the mobile unit isolation method of the present invention. Different equipment may be located at the cell sites, as described in copending U.S. patent application Ser. No. 08/951,685 (Attorney Docket No. 3384.0045-00), which is hereby incorporated by reference.

Cell site 1100 includes antenna 1110, Radio Frequency (RF) and Interface (IF) front end equipment 1120, and DSP Radio Server 1130. Narrowband backhaul transport 1140 couples the cell site equipment to Mobile Switching Center (MSC) 1200. A backhaul transport is a communication link between the cell site and the trunk resource or switching fabric of the communication system. Backhaul transport 1140 is T1/E1 used to carry Time Division Multiplex (TDM), Frame Relay traffic, or narrowband ATM, including control and voice communications.

Cell site 1300 contains less equipment than cell site 1100, just antenna 1310 and RF/IF front end equipment 1320. Broadband backhaul transport 1330 couples the equipment at cell site 1300 to centralized DSP Radio Server 1400, which in turn communicates with MSC 1200. Broadband backhaul transport 1330 carries high-speed wideband digitized radio signals from the cell site equipment over an ATM network.

Cell site 1500 contains the least amount of equipment, just antenna 1510 and power management component 1520. The RF signal from the cell site 1500 equipment is transmitted over RF Fiber Transport backhaul 1530 to DSP Radio Server

1400. RF Fiber Transport backhaul 1530 distributes the RF signal through analog fiber and communicates the signal to DSP Radio Server 1400 over the ATM network.

The specific functions performed by the various cell site equipment are described in copending U.S. patent application Ser. No. 08/951,885 (Attorney Docket No. 3384.0045-00), referred to above.

Figure 2:
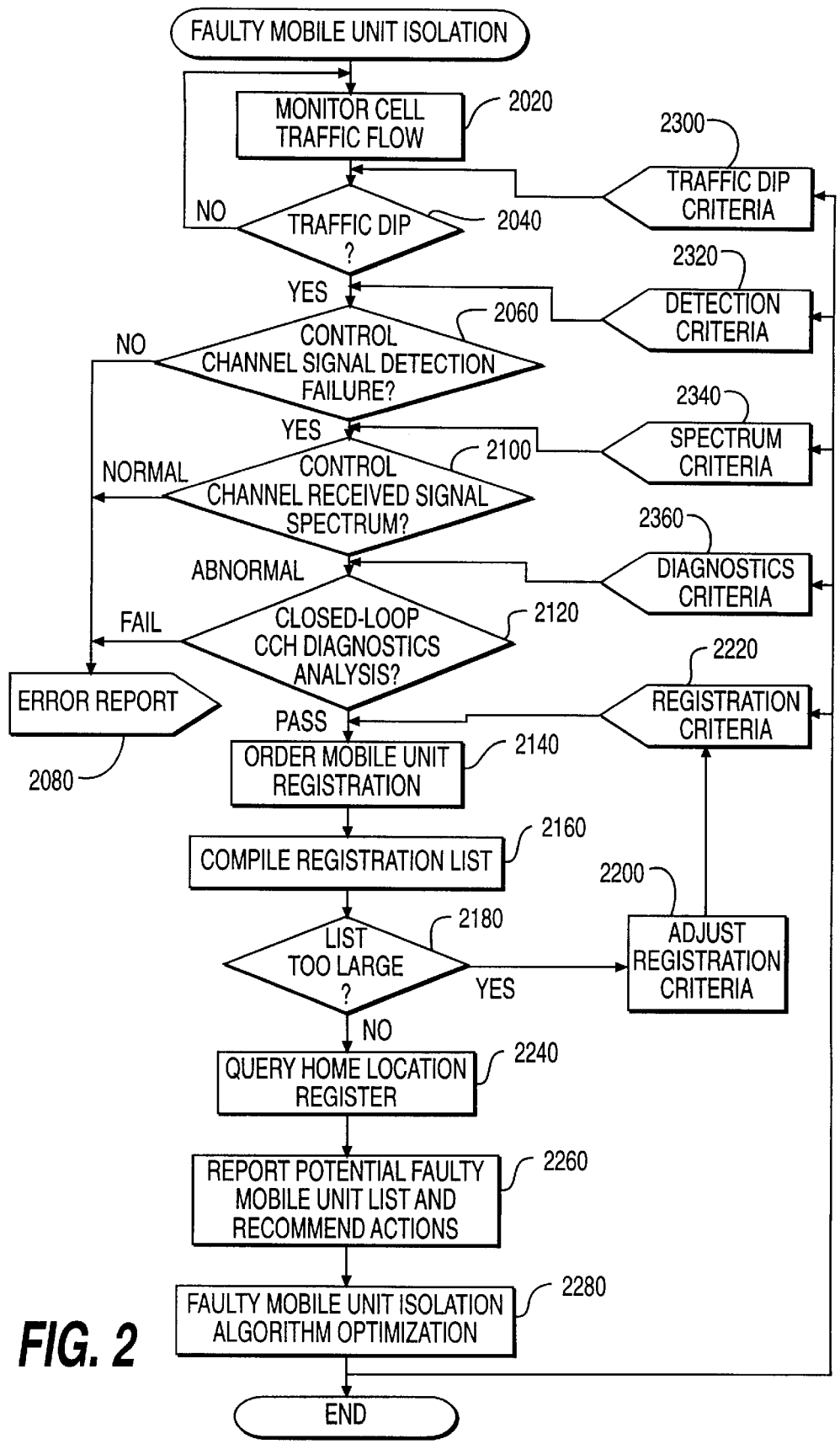
FIG. 2 is a flowchart illustrating a preferred implementation of the faulty mobile unit isolation method of the present invention.

FIG. 2 is a flowchart illustrating the steps of a preferred implementation of a faulty mobile unit isolation method according to this invention. In this implementation, MSC 1200 contains the equipment to execute the faulty mobile unit isolation method.

Figure 3A:
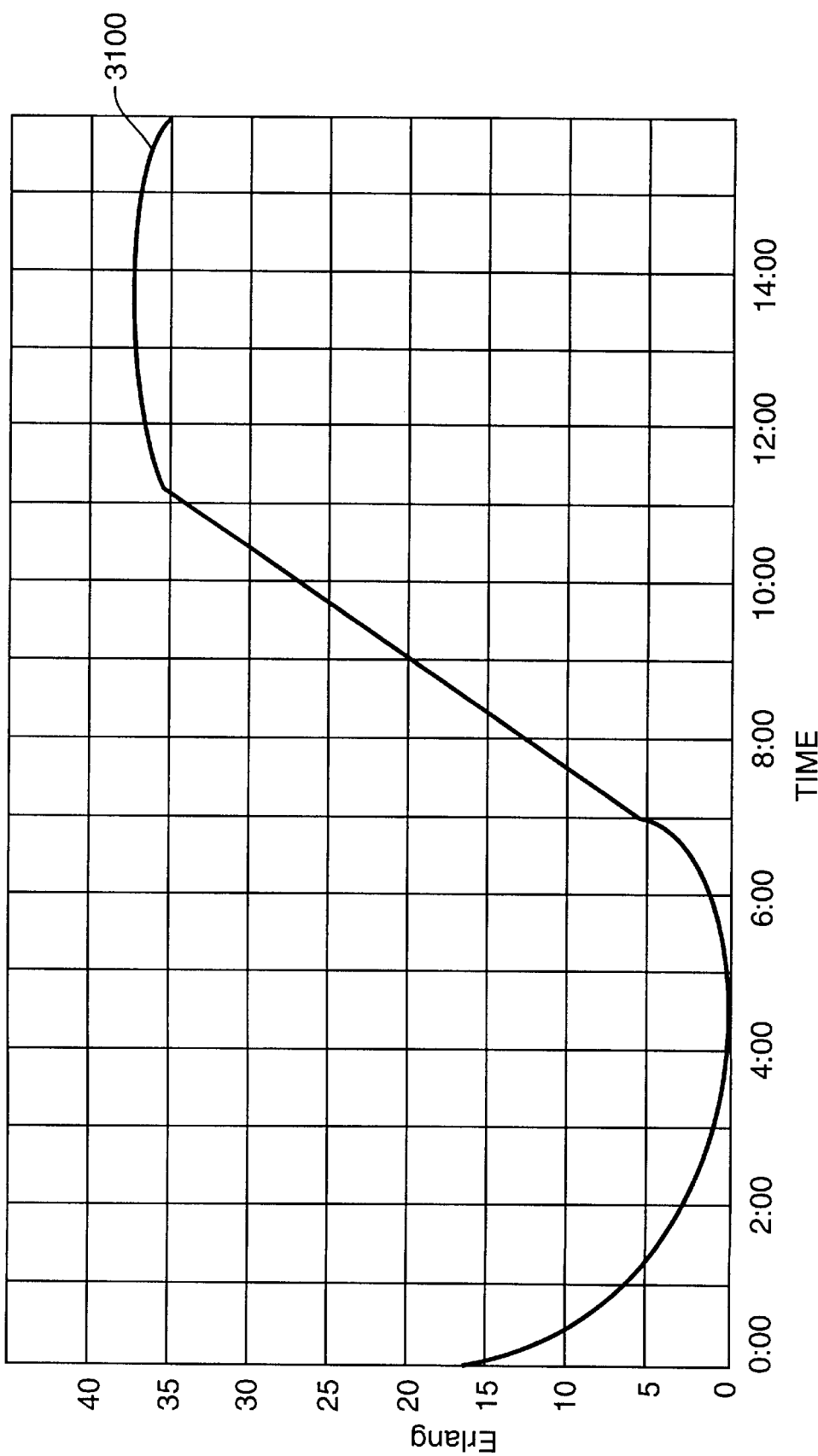
FIGS. 3A and 3B are graphs showing examples of normal and abnormal cell traffic, respectively.
Figure 3B:
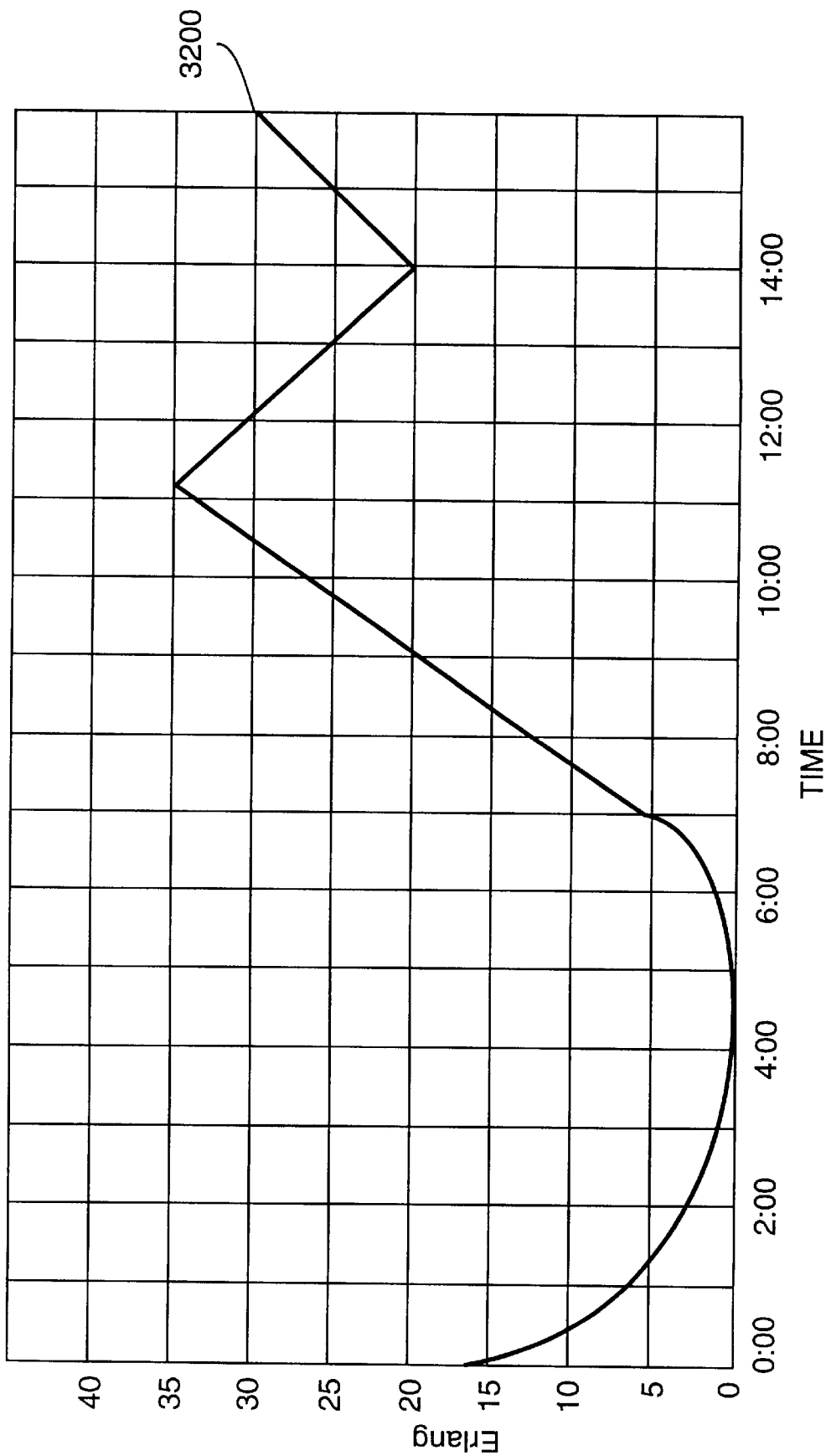

MSC 1200 continuously monitors the cell traffic in the cell sites under its control [step 2020]. The purpose of such monitoring is to detect abnormal traffic. FIGS. 3A and 3B depict graphs of normal cell traffic 3100 and abnormal cell traffic 3200, respectively, as a function of Time and Erlang. A rapid decrease, or dip, in the cell traffic pattern over a short period of time indicates an abnormal condition 3200, whereas a smooth cell traffic pattern indicates a normal condition 3100.

If MSC 1200 finds the cell traffic pattern in the cell sites to contain no traffic dips (such as cell traffic 3100 in FIG. 3A) [step 2040], then MSC 1200 continues its monitoring [step 2020] because conditions are normal. If, however, MSC 1200 finds that the cell traffic dips by more than a predetermined amount [step 2040], as cell traffic 3200 does in FIG. 3B, then MSC 1200 begins to determine whether there has been a CCH signal detection failure [step 2060]. CCH signal detection failure can occur, for example, when a faulty mobile unit is jamming the CCH or as a result of a network error, such as an error in the CCH itself.

If MSC 1200 determines that there is no CCH signal detection failure [step 2060], preferably by standard tests, then MSC 1200 reports an error [step 2080] because the dip in the cell traffic must be the result of a network error, not a faulty mobile unit. When a faulty mobile unit causes a dip in the cell traffic, a CCH signal detection failure occurs from the faulty mobile unit jamming the CCH. Therefore, no CCH signal detection failure means the dip in the cell traffic must have been the result of a network error.

If MSC 1200 determines that there is a CCH signal detection failure [step 2060], then MSC 1200 analyzes the received signal spectrum of the CCH for normal or abnormal activity [step 2100]. Burst activity (i.e., multiple mobile units accessing the CCH and generating a repeating burst and disappear pattern) constitutes normal activity. Continuous activity (i.e., one mobile unit accessing and holding the CCH) constitutes abnormal activity.

If the analysis of the CCH-received signal spectrum indicates normal burst activity [step 2100], then MSC 1200 reports an error [step 2080]. This is because the dip in the cell traffic and the CCH signal detection failure must be a result of a network error, not a faulty mobile unit that would hold, and thus create continuous activity on, the CCH.

If analysis of the CCH received signal spectrum indicates abnormal (i.e., continuous) activity [step 2100], then MSC 1200 performs closed-loop CCH diagnostics analysis using predetermined diagnostics criteria [step 2120]. The closed-loop CCH diagnostics analysis entails performing various closed-loop testing of the cell site equipment to determine whether the problem is a result of a network or mobile unit error.

If the closed-loop CCH diagnostics analysis fails [step 2120], then MSC 1200 reports an error [step 2080] because the problem is a result of a network error, not a faulty mobile unit. If the closed-loop CCH diagnostics analysis passes [step 2120], then MSC 1200 sends out a message on the CCH for all mobile units meeting predetermined registration criteria to register themselves [step 2140]. The predetermined registration criteria preferably includes a minimum signal strength requirement.

Every mobile unit in the service area of MSC 1200 having a signal strength matching or exceeding the minimum signal strength requirement, including the faulty mobile unit, attempts to respond over the CCH to the registration message. Not all mobile units will be able to register, however, because the faulty mobile unit is continuously holding the CCH in its cell site. The mobile units register by sending a signal identifying themselves by identification number and manufacturer number to the cell site.

MSC 1200 generates a list of registering mobile units [step 2160]. If the registration list contains more than a predetermined number of potentially faulty mobile units [step 2180], MSC 1200 adjusts the registration criteria by increasing the required minimum signal strength [steps 2200, 2220] and reorders mobile unit registration based on the adjusted criteria [step 2140]. Steps 2140 through 2220 are repeated for a number of iterations until a small enough number of potentially faulty mobile units remain in the registration list.

When MSC 1200 narrows the registration list into a small enough list of potentially faulty mobile units [step 2180], MSC 1200 queries the respective Home Location Register (HLR) of each of the mobile units on the list [step 2240]. The HLRs of the mobile units provide detailed reports on the respective mobile units, including such information as the identification number, telephone number, cell site location, and home system of the mobile unit.

Based on the detailed reports from the HLRs, MSC 1200 generates and reports a Potential Faulty Mobile Unit List to system operators and recommends actions to be taken to compensate for the presence of the faulty mobile unit [step 2260]. Recommended actions might include reshaping the cell site boundary by adjusting the system parameters of the cell sites adjacent to the cell site containing the faulty mobile unit. Adjusting the system parameters could include increasing the antenna transmission and reception power of the adjacent cell sites to allow these adjacent cell sites to cover portions of the problem cell site.

Figure 4:
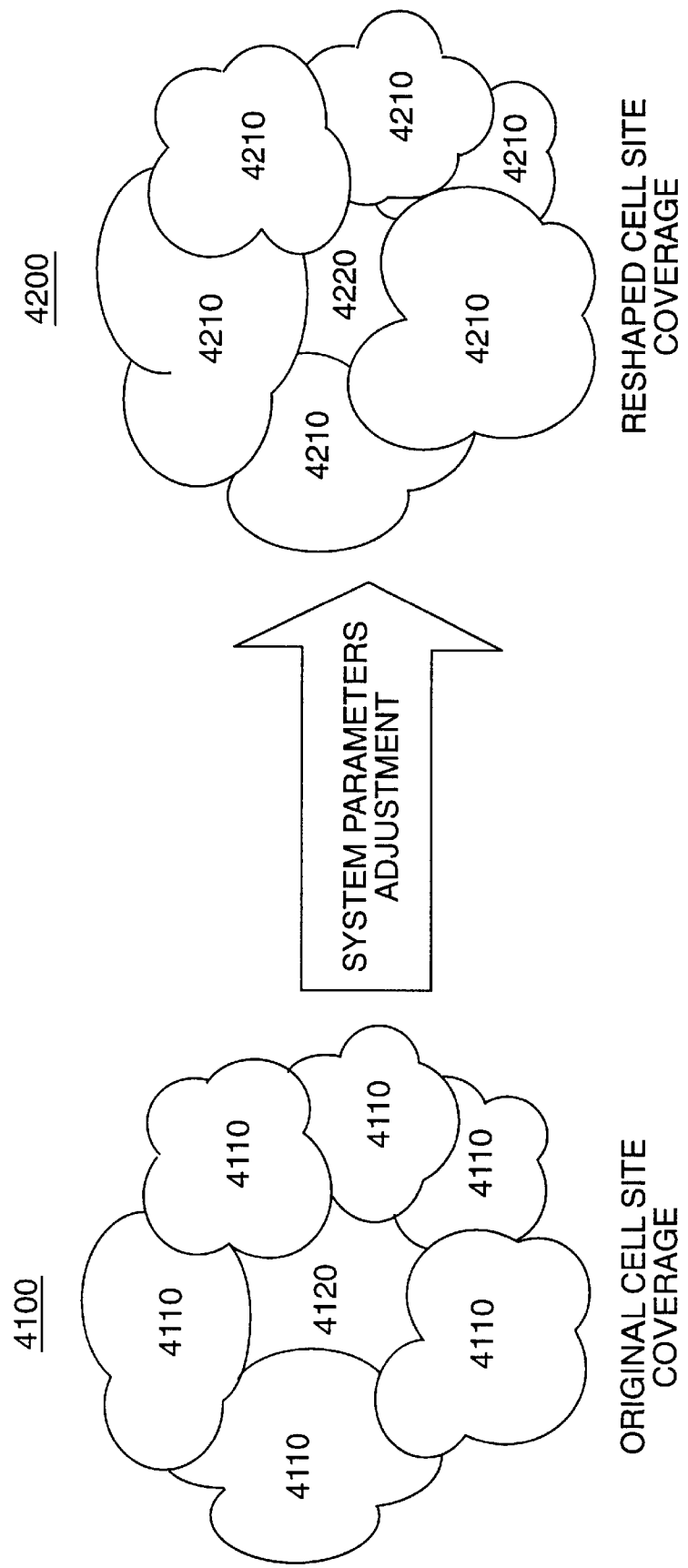
FIG. 4 shows cell site coverage existing before and after system parameter adjustment.

FIG. 4 shows an example of cell site coverage before the system parameter adjustment 4100 and reshaped cell site coverage after the system parameter adjustment 4200. Increasing the antenna transmission and reception strength in adjacent cell sites 4110 reshapes their coverage areas to access by mobile units in cell site 4120, whose CCH is jammed by the faulty mobile unit. Some mobile units in cell site 4120 may then communicate over the CCH of one of the reshaped adjacent cell sites 4210.

Furthermore, when the faulty mobile unit moves to an adjacent cell site's reshaped coverage area 4210, it may release the CCH it is jamming in cell site 4220 to attempt to communicate over the adjacent cell site's CCH. The faulty mobile unit may have weaker signal strength in reshaped adjacent cell site 4210 due to its location with respect to the base station of the adjacent cell site. If that happens, the faulty mobile unit will not be able to jam the adjacent cell site's CCH continuously as it did in cell site 4220.

Based on the Potential Faulty Mobile Unit List generated by MSC 1200, system technicians can isolate the faulty mobile unit. Equipped with the manageable list of potentially faulty mobile units and their respective cell site locations, system technicians can visit the respective cell sites and, using direction antennas, can locate and remove the faulty mobile unit from operation.

Once MSC 1200 reports the Potential Faulty Mobile Unit List and recommends actions, MSC 1200 performs faulty mobile unit isolation algorithm optimization [step 2280]. Faulty mobile unit isolation algorithm optimization entails recording information regarding the detection of the faulty mobile unit and the system criteria used in the detection in a database matrix. The system criteria includes traffic dip criteria 2300, detection criteria 2320, spectrum criteria 2340, diagnostics criteria 2360, and registration criteria 2220.

Preferably, MSC 1200 initially sets the system criteria to a low level and records the detection results in the database matrix. MSC 1200 then adjusts the system criteria and updates the detection results. After several iterations, MSC 1200 learns the optimal criteria for achieving the best detection results.

As the discussion surrounding FIG. 2 shows, the wireless network according to the present invention alleviates and compensates for service disruption caused by a faulty mobile unit jamming the CCH.

The foregoing description of a preferred embodiment of the invention has been presented for purposes of illustration and description. It is not intended to be exhaustive or to limit the invention to the precise form disclosed. Modifications and variations are possible in light of the above teachings or may be acquired from practice of the invention. For example, the MSC of the present invention executes the faulty mobile unit isolation method, but the method may be executed by other network elements, such as a DSP radio server or a base station controller. The scope of the invention is defined by the claims and their equivalents.

We claim:

1. A method for isolating a faulty mobile unit from a plurality of mobile units operating in a cell of a wireless network, comprising the steps of:

monitoring traffic among the mobile units in the cell to detect an abnormality in a cell traffic pattern;

determining whether the abnormality is due to the faulty mobile unit; and communicating with the plurality of mobile units in the cell, if the abnormality is due to the faulty mobile unit, to isolate the faulty mobile unit.

2. The method of claim 1, wherein the determining step includes the step of determining the presence of a control channel signal detection failure when the cell traffic pattern exhibits an abnormality.

3. The method of claim 2, wherein the determining step further includes the step of checking signal reception on the control channel for an abnormal condition when a control channel signal detection failure is present.

4. The method of claim 3, wherein the determining step further includes the step of performing closed-loop control channel diagnostics analysis to determine a source of the control channel signal detection failure and the cell traffic pattern abnormality when the control channel signal reception indicates an abnormal condition.

5. The method of claim 4, wherein the communicating step includes the step of requesting registration from the mobile units in the cell when the closed-loop control channel diagnostics analysis indicates that the faulty mobile unit is the source of the control channel signal detection failure and the abnormality in the cell traffic pattern.

6. The method of claim 5, wherein the communicating step further includes the steps of generating a list of potentially faulty mobile units from mobile units responding to the registration request; and isolating the faulty mobile unit from the list of potentially faulty mobile units.

7. The method of claim 6, wherein the list generating step includes the step of querying respective home location registers of the mobile units on the list of potentially faulty mobile units.

8. The method of claim 7, wherein the isolating step includes the step of examining contents of the home location registers queried.

9. The method of claim 5, wherein the requesting step includes the step of requesting registration only from mobile units in the cell that meet predetermined criteria.

10. The method of claim 1, wherein the communicating step includes the step of requesting registration from the mobile units in the cell when the abnormality in the cell traffic pattern is due to the faulty mobile unit.

11. The method of claim 10, wherein the communicating step further includes the steps of generating a list of potentially faulty mobile units from mobile units responding to the registration request; and isolating the faulty mobile unit from the list of potentially faulty mobile units.

12. The method of claim 11, wherein the list generating step includes the step of querying respective home location registers of the mobile units on the list of potentially faulty mobile units.

13. The method of claim 12, wherein the isolating step includes the step of examining contents of the home location registers queried.

14. The method of claim 10, wherein the requesting step includes the step of requesting registration only from mobile units in the cell that meet predetermined criteria.

15. The method of claim 1, further including the step of recommending actions to be taken to compensate for the faulty mobile unit.

16. A method for isolating a faulty mobile unit from a plurality of mobile units operating in a cell of a wireless network, comprising the steps of:

monitoring traffic among the mobile units in the cell;

determining the presence of a control channel signal detection failure when the monitored traffic pattern exhibits a decrease in cell traffic that exceeds predetermined criteria;

checking signal reception on the control channel for an abnormal condition when a control channel signal detection failure is present;

performing closed-loop control channel diagnostics analysis to determine a source of the cell traffic pattern decrease when the control channel signal reception indicates an abnormal condition; and communicating with the plurality of mobile units in the cell, if the cell traffic pattern decrease is due to the faulty mobile unit, to isolate the faulty mobile unit.

17. The method of claim 16, wherein the communicating step includes the step of requesting registration from the mobile units in the cell when the decrease in the cell traffic pattern is due to the faulty mobile unit.

18. The method of claim 17, wherein the communicating step further includes the steps of generating a list of potentially faulty mobile units from mobile units responding to the registration request; and isolating the faulty mobile unit from the list of potentially faulty mobile units.

19. The method of claim 18, wherein the list generating step includes the step of querying respective home location registers of the mobile units on the list of potentially faulty mobile units.

20. The method of claim 19, wherein the isolating step includes the step of examining contents of the home location registers queried.

21. The method of claim 17, wherein the requesting step includes the step of requesting registration only from mobile units in the cell that meet predetermined criteria.

22. The method of claim 16, further including the step of recommending actions to be taken to compensate for the faulty mobile unit.

23. A method for isolating a faulty mobile unit from a plurality of mobile units operating in a cell of a wireless network, comprising the steps of:

monitoring traffic among the mobile units in the cell to detect an abnormality in a cell traffic pattern;

determining whether the abnormality is due to the faulty mobile unit;

requesting registration from the mobile units in the cell if the abnormality is due to the faulty mobile unit;

generating a list of potentially faulty mobile units from mobile units responding to the registration request; and isolating the faulty mobile unit from the list of potentially faulty mobile units.

24. A system for isolating a faulty mobile unit of a plurality of mobile units operating in a cell of a wireless network, comprising:

means for monitoring traffic among the mobile units in the cell to detect an abnormality in a cell traffic pattern;

means for determining whether the abnormality is due to the faulty mobile unit; and means for communicating with the plurality of mobile units in the cell, if the abnormality is due to the faulty mobile unit, to isolate the faulty mobile unit.

25. The system of claim 24, wherein the determining means includes means for determining the presence of a control channel signal detection failure when the cell traffic pattern exhibits an abnormality.

26. The system of claim 25, wherein the determining means further includes means for checking signal reception on the control channel for an abnormal condition when a control channel signal detection failure is present.

27. The system of claim 26, wherein the determining means further includes means for performing closed-loop control channel diagnostics analysis to determine a source of the control channel signal detection failure and the cell traffic pattern abnormality when the control channel signal reception indicates an abnormal condition.

28. The system of claim 27, wherein the communicating means includes means for requesting registration from the mobile units in the cell when the closed-loop control channel diagnostics analysis indicates that the faulty mobile unit is the source of the control channel signal detection failure and the abnormality in the cell traffic pattern.

29. The system of claim 28, wherein the communicating means further includes means for generating a list of potentially faulty mobile units from mobile units responding to the registration request; and means for isolating the faulty mobile unit from the list of potentially faulty mobile units.

30. The system of claim 29, wherein the list generating means includes means for querying respective home location registers of the mobile units on the list of potentially faulty mobile units.

31. The system of claim 30, wherein the isolating means includes means for examining contents of the home location registers queried.

32. The system of claim 28, wherein the requesting means includes means for requesting registration only from mobile units in the cell that meet predetermined criteria.

33. The system of claim 24, wherein the communicating means includes means for requesting registration from the mobile units in the cell when the abnormality in the cell traffic pattern is due to the faulty mobile unit.

34. The system of claim 33, wherein the communicating means further includes means for generating a list of potentially faulty mobile units from mobile units responding to the registration request; and means for isolating the faulty mobile unit from the list of potentially faulty mobile units.

35. The system of claim 34, wherein the list generating means includes means for querying respective home location registers of the mobile units on the list of potentially faulty mobile units.

36. The system of claim 35, wherein the isolating means includes means for examining contents of the home location registers queried.

37. The system of claim 33, wherein the requesting means includes means for requesting registration only from mobile units in the cell that meet predetermined criteria.

38. The system of claim 24, further including means for recommending actions to be taken to compensate for the faulty mobile unit.

39. The system of claim 24, wherein the wireless network further includes a mobile switching center providing communication among the plurality of cells.

40. The system of claim 39, wherein the system is located within the mobile switching center.

41. A system for isolating a faulty mobile unit of a plurality of mobile units operating in a cell of a wireless network, the plurality of mobile units communicating with the cell over a control channel, the system comprising:

means for monitoring traffic among the mobile units in the cell;

means for determining the presence of a control channel signal detection failure when the monitored traffic pattern exhibits a decrease in cell traffic that exceeds predetermined criteria;

means for checking signal reception on the control channel for an abnormal condition when a control channel signal detection failure is present;

means for performing closed-loop control channel diagnostics analysis to determine a source of the cell traffic pattern decrease when the control channel signal reception indicates an abnormal condition; and means for communicating with the plurality of mobile units in the cell, if the cell traffic pattern decrease is due to the faulty mobile unit, to isolate the faulty mobile unit.

42. The system of claim 41, wherein the communicating means includes means for requesting registration from the mobile units in the cell when the decrease in the cell traffic pattern is due to the faulty mobile unit.

43. The system of claim 42, wherein the communicating means further includes means for generating a list of potentially faulty mobile units from mobile units responding to the registration request; and means for isolating the faulty mobile unit from the list of potentially faulty mobile units.

44. The system of claim 43, wherein the list generating means includes means for querying respective home location registers of the mobile units on the list of potentially faulty mobile units.

45. The system of claim 44, wherein the isolating means includes means for examining contents of the home location registers queried.

46. The system of claim 42, wherein the requesting means includes means for requesting registration only from mobile units in the cell that meet predetermined criteria.

47. The system of claim 41, further including means for recommending actions to be taken to compensate for the faulty mobile unit.

48. A system for isolating a faulty mobile unit of a plurality of mobile units operating in a cell of a wireless network, comprising:

means for monitoring traffic among the mobile units in the cell to detect an abnormality in a cell traffic pattern;

means for determining whether the abnormality is due to the faulty mobile unit;

means for requesting registration from the mobile units in the cell if the abnormality is due to the faulty mobile unit;

means for generating a list of potentially faulty mobile units from mobile units responding to the registration request; and means for isolating the faulty mobile unit from the list of potentially faulty mobile units.

49. A cell of a wireless network having a faulty mobile unit of a plurality of mobile units operating therein, comprising:

means for gathering information regarding traffic among the mobile units; and means for transmitting a registration request to the mobile units to isolate the faulty mobile unit, when the information indicates a decrease in the traffic that exceeds a predetermined criteria.

* * * * *